(12) United States Patent
Gallant et al.

(10) Patent No.: US 8,567,720 B2
(45) Date of Patent: Oct. 29, 2013

(54) SECTION OF AIRCRAFT FUSELAGE AND AIRCRAFT INCLUDING ONE SUCH SECTION

(75) Inventors: Guillaume Gallant, Plaisance du Touch (FR); Damien Aguera, Toulouse (FR); Philippe Bernadet, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 674 days.

(21) Appl. No.: 12/521,367

(22) PCT Filed: Jan. 3, 2008

(86) PCT No.: PCT/FR2008/050006
§ 371 (c)(1),
(2), (4) Date: Sep. 22, 2010

(87) PCT Pub. No.: WO2008/096087
PCT Pub. Date: Aug. 14, 2008

(65) Prior Publication Data
US 2011/0017870 A1    Jan. 27, 2011

(30) Foreign Application Priority Data
Jan. 5, 2007  (FR) .................................... 07 52537

(51) Int. Cl.
*B64C 1/14*  (2006.01)
(52) U.S. Cl.
USPC ...................................... 244/119; 244/129.3

(58) Field of Classification Search
USPC ........ 244/119, 129.3, 129.5; 52/204.1, 204.6, 52/171.1, 656.5, 657
See application file for complete search history.

(56) References Cited

U.S. PATENT DOCUMENTS

| | | | | |
|---|---|---|---|---|
| 3,429,530 A | * | 2/1969 | Hertel | 244/129.3 |
| 6,736,352 B2 | * | 5/2004 | Bladt et al. | 244/129.3 |
| 7,325,771 B2 | * | 2/2008 | Stulc et al. | 244/119 |
| 7,431,239 B2 | * | 10/2008 | Anderson et al. | 244/119 |
| 7,942,369 B2 | * | 5/2011 | Mahieu et al. | 244/129.3 |
| 8,104,715 B2 | * | 1/2012 | Brownjohn et al. | 244/129.3 |
| 8,322,656 B2 | * | 12/2012 | Pahl | 244/120 |
| 2002/0056788 A1 | * | 5/2002 | Anderson et al. | 244/119 |
| 2007/0210211 A1 | * | 9/2007 | Grob | 244/119 |
| 2009/0166471 A1 | * | 7/2009 | Pahl | 244/119 |
| 2010/0320324 A1 | * | 12/2010 | Dittmar et al. | 244/129.3 |

FOREIGN PATENT DOCUMENTS

DE       4408476 A1 * 9/1995
WO   WO 2009109456 A1 * 9/2009

* cited by examiner

*Primary Examiner* — Tien Dinh
*Assistant Examiner* — Michael Kreiner
(74) *Attorney, Agent, or Firm* — Jenkins, Wilson, Taylor & Hunt, P.A.

(57) ABSTRACT

The invention relates to a section of fuselage for an aircraft, including frames and bays for receiving cabin windows. According the disclosed embodiments, at least some of the frames include at least one frame segment that surrounds at least one bay, the frame segment having two branches that are disposed to the side of the bay. The ends of the branches are attached to each of the ends of the frame segment such as to form a Y.

13 Claims, 3 Drawing Sheets

A-A

SECTION OF AIRCRAFT FUSELAGE AND AIRCRAFT INCLUDING ONE SUCH SECTION

CROSS-REFERENCE TO RELATED APPLICATIONS

This application claims priority to International Application PCT/FR2008/050006 filed 3 Jan. 2008, which claims priority to French Application No. 07 52537 filed on 5 Jan. 2007, the disclosure of which are incorporated by reference herein their entireties.

BACKGROUND

1. Field

The disclosed embodiments relate to a section of a fuselage for an aircraft and an aircraft including such a section.

2. Brief Description of the Related Developments

It is known that commercial planes include a typically pseudo-cylindrical fuselage reinforced by stiffening elements such as stringers and frames so as to resist the mechanical constraints which are exerted in flight for example.

In commercial aircrafts for example, openings are provided in the side walls of the fuselage to receive windows and makes it possible for the passengers to directly see the environment outside the fuselage.

However, these windows generate many drawbacks. First, a window on an airplane must provide a heat and sound insulation of the internal space of the fuselage from the outside in order to provide some comfort to the passengers. It must also be air and water tight.

The frame of the window which is typically riveted to the skin of the fuselage must also resist the mechanical constraints such as the loads resulting from the flexion of the fuselage and the pressurization which is applied to the window.

The window must then have the aero-dynamical profile of the aircraft.

All these constraints led the manufacturers to a specific stiffening of the window area.

FIG. 1 is a partial view of a section of the fuselage of an aircraft of the prior art. This section includes windows 1 which are regularly spaced while being aligned along a longitudinal axis 2 of the fuselage section. It also includes frames 3, also called torques, which make it possible to mechanically reinforce the section of the fuselage and to give the side the shape thereof. The frame pitch which means the distance separating two successive pitches 3 is greater than the width of the windows 1.

FIG. 2 schematically shows the mechanical constraints which these windows 1 can be submitted to.

The mechanical constraints are of two types. These are generally shearing forces 4 connected to the flexion of the fuselage and pressurization forces 5 which transversally act and longitudinally act with respect to the fuselage section.

All these constraints led the manufacturers to a specific stiffening of the window area 1 with over-thicknesses of the fuselage wall at the opening of the window 1 and a frame to guarantee the mechanical resistance of the window.

The assembling of the windows 1 in the openings of the side walls of the fuselage section is carried out using mechanical fasteners.

However, this assembling means a task which is difficult to the operators and time consuming. This assembling is thus expensive as regards the detention of the plane in case of maintenance.

In addition, these specific reinforcements of the fuselage wall also mean an additional weight which has a negative effect on the plane consumption of kerosene.

Thus, there exists a need for reducing the specific mass of the aircraft fuselage while providing the mechanical behavior of the wall of the fuselage at the level of the aircraft, in the vicinity of windows.

SUMMARY

The aim of the disclosed embodiments are thus to provide a simple fuselage section for an aircraft, which has a simple design and operation, having a very high mechanical resistance for legal section of an airplane while enabling to reduce the mass of the fuselage structure of this aircraft.

This reduction in the mass of the fuselage structure is all the more important since the pattern of the window mesh is repeated many times on the latter.

Another aim of the disclosed embodiments ares a fuselage section including sections having greater dimensions than those met in the state of the art.

For this purpose, the disclosed embodiments relate to a fuselage section for an aircraft including frames and openings for receiving windows.

According to the disclosed embodiments, at least some of these frames include at least one frame sector surrounding at least one opening, with this frame sector including two branches positioned laterally with respect to the opening, with the ends of said branches being coupled so as to form a Y at each end of this frame sector.

Advantageously, the disclosed embodiments can be applied to any type of known aircraft fuselage. Purely as an illustration, the side wall of a fuselage section for a double deck aircraft includes for each deck a row of openings intended to received windows and frames. At least some of the frames include, each, two frame sectors, i.e. a frame sector per window and per deck.

The fuselage section of the disclosed embodiments are particularly adapted to the fuselage of an aircraft wherein the width of the windows is substantially as big as or even greater than the distance separating two successive frames of the fuselage.

In addition, a frame sector may surround a window whether in one piece or several parts. In this later case, these parts are then spaced by one or several cross members. As an illustration, a cross member may divide a field of view into two openings having a triangular, semi-circular or any other shape.

In various particular embodiments of this fuselage section, each having its particular advantages and liable to many possible technical combinations:

the branches of the frame sector form a recess for receiving means for fixing a window onto said opening.

These means for fixing a window preferably include a fastening clip and members for making this clip integral with the frame of the window. These integration members include for example studs, screws and bolts.

the frame sector including a window fixed to said opening by means for fixing a window include a fastening clip, at least the part of the perimeter of this fastening clip has a shape cooperating with the branches of the frame sector for the uptake of efforts.

The fastening clip which is to be mounted on the frame of the window has thus preferably the shape of the side perimeter of which may match the internal periphery of each branch of this frame sector so as to uptake the opening efforts and the deviations thereof.

said frame including at least two frame portions, with this fuselage section including members for fixing this frame sector on the frame portions, this fastening members including splice-plates, the frame sector is made in one piece and of composite material, Advantageously, these frame sectors are made of composite material meeting the mechanical resistance and resistance to corrosion criteria related to the applications in the field of aeronautics.

For example, it is made of a composite material based on carbon fibers and resin manufactured using an injection or stamping method.

Two successive frame supports in the longitudinal direction of the fuselage section are connected together through a stabilizing plate.

This stabilizing plate makes it possible to advantageously define a recess between two frame sectors liable to receive one or several extended element(s) such as cables or air conditioning ducts.

Such fuselage section includes a stringer positioned between the opening and at least one end of the frame sector.

Finally, the disclosed embodiments relate to an aircraft having a fuselage, the side walls of which are provided with windows.

According to the disclosed embodiments, the fuselage includes at least one fuselage section such as previously described.

Advantageously, the transversal dimension of the windows of said aircraft is greater than or equal to the distance separating two successive frames of the fuselage.

The disclosed embodiments will be described in greater detail and referring to the appended drawings, wherein:

DETAILED DESCRIPTION

Figure 3:
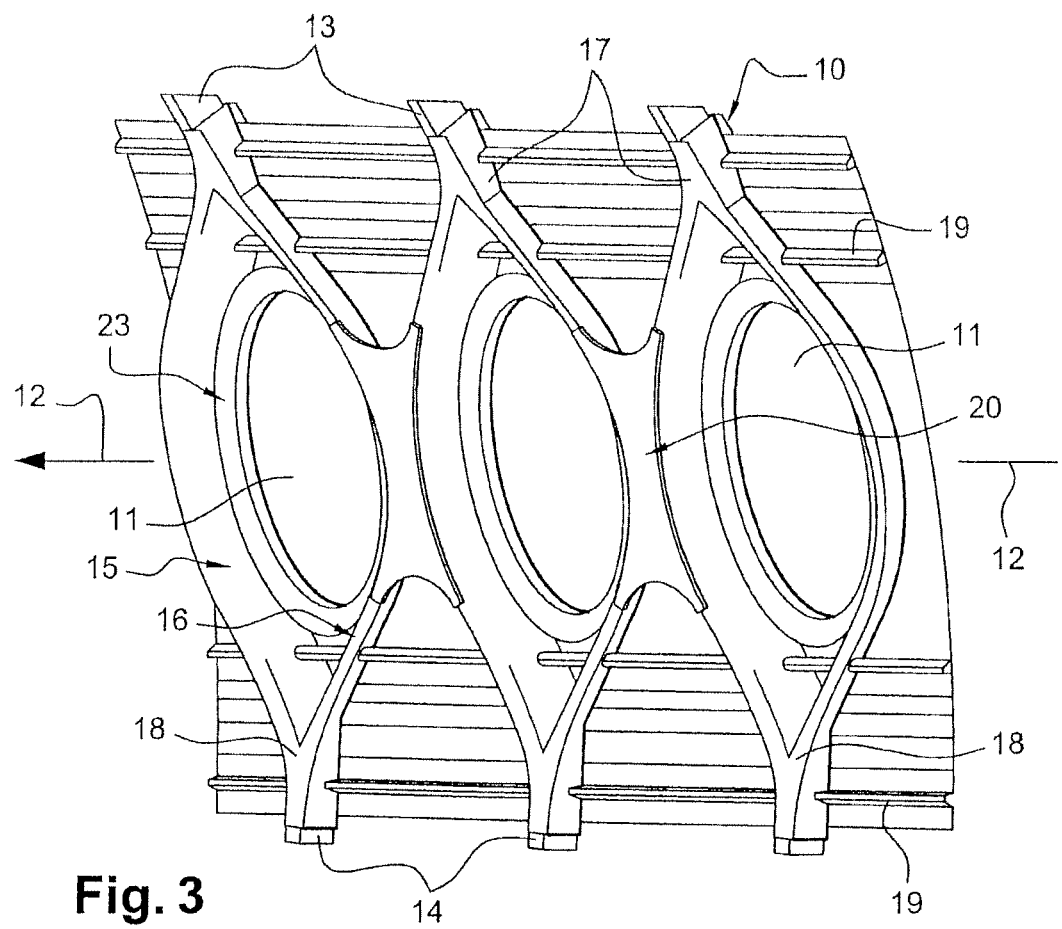
FIG. 3 is a perspective view of the fuselage section for an aircraft according to a particular embodiment of the disclosed embodiments.

FIG. 3 shows a fuselage section for an aircraft according to a particular embodiment of the disclosed embodiments. The fuselage section can be one composite fuselage section. As an illustration, the fuselage section can be carbon fiber-based.

The fuselage section includes frames 10 and windows 11 mounted on openings. These windows 11 are aligned and regularly spaced along the longitudinal axis 12 of the fuselage section.

Each frame 10 includes two frame portions 13, 14 connected together by a frame sector surrounding a window 11. The frame sector is made integral with these frame portions 13, 14 by means of fixing members. The latter includes for example splice-plates which provide the connection of the frame sector to the frame of the upper structure and the lower structure thus giving a certain flexibility to the positioning.

These splice-plates can be made of metal or of composite materials. As an illustration, they are made of titanium, inconel or aluminum alloy when they are made of metal. But they can alternatively be made of thermoplastic composites.

The window 11 includes, in a known way, an external transparent element, at least one internal transparent element and a window frame.

The internal transparent element of this window preferably has an elliptical shape. Advantageously, the dimensions of the internal transparent element of the window are of the order of 520×299 mm thus offering a wider field of view for the passenger than the known windows of the prior art.

Of course, the window 11 may have any other shape selected in the group including a triangular shape, a circular, or a rectangular or any other shape.

Each frame sector includes two branches 15, 16 which are positioned laterally with respect to the window 11 and the ends of which are coupled so as to form a Y at each of the ends 17, 18 of the frame sector.

The branches 15, 16 also have in their central part a dome-shape so that the frame sector has a substantially elliptical shape.

Each window 11 is substantially centered on the corresponding frame sector thereof, with a space separating the side branches 15, 16 from the frame sector of the perimeter of the window 11.

The stiffening elements of the fuselage section further include frames 10 and stringers 19. The fuselage section includes a stringer 19 positioned between the window 11 and each end 17, 18 of the frame sector. This stringer 19 is positioned tangentially to the window 11 and makes it possible to provide edges to the upper and lower ends of the opening of the side wall of the fuselage receiving the window 11. In addition, the stiffening outside the plane of the fuselage section of the disclosed embodiments is thus minimized.

Figure 4:
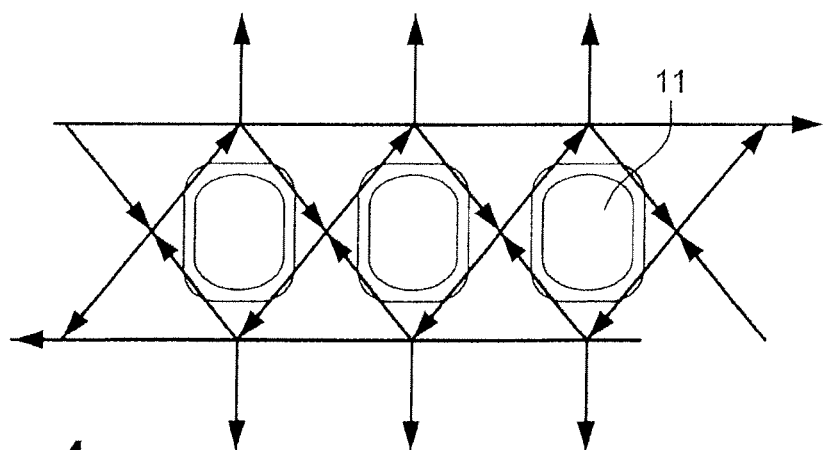
FIG. 4 is a schematic representation of the mechanical constraints which can be exerted on the windows of the fuselage section of FIG. 3.

FIG. 4 schematically shows the result of a simulation of constraints exerted on the fuselage section and more particularly on the windows 11.

Figure 1:
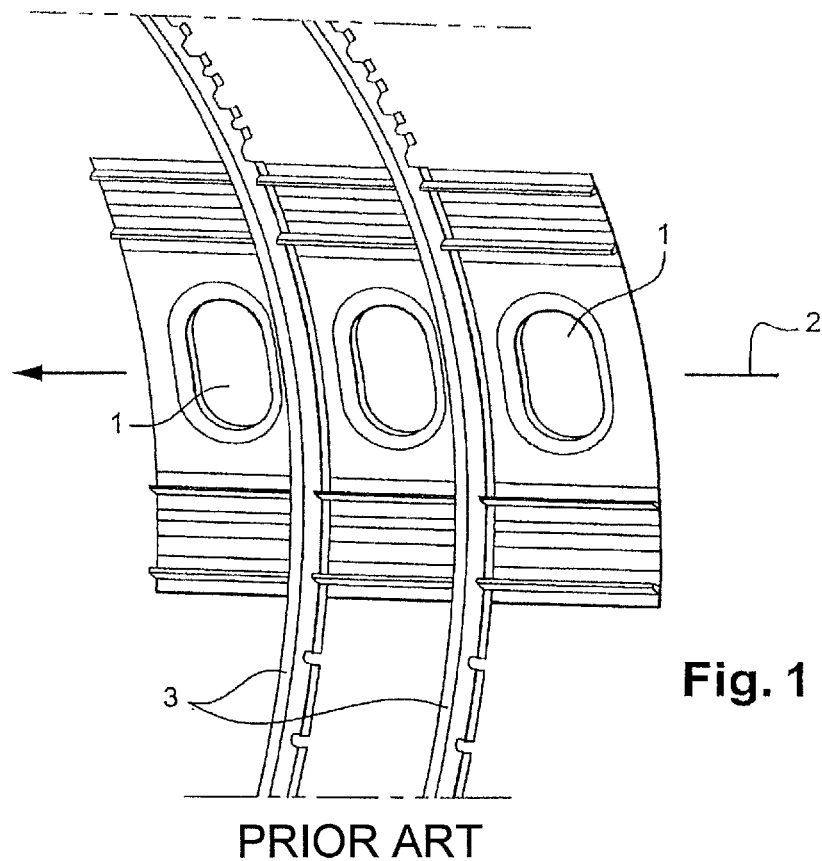
FIG. 1 schematically shows the partial view of a fuselage section of the prior art aircraft.
Figure 2:
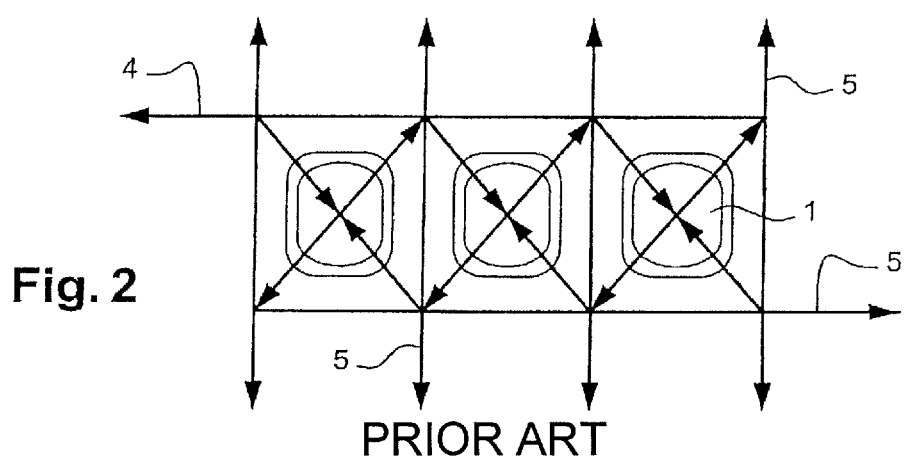
FIG. 2 is a schematic representation of the mechanical constraints which can be exerted inside the windows of the fuselage section of FIG. 1.

It should be noted that the frame sectors of the disclosed embodiments advantageously discharge the flow connected to the Y pressurization about the windows. When comparing FIGS. 2 and 4, it should be noted that the windows 11 are thus no longer directly submitted to the constraints resulting from the pressurization, contrarily to the state of the art. The passage of the constraints from the lower zone to the upper zone of the fuselage section makes it possible to increase the dimensions of the windows.

In addition, the frame sectors are directed along the diagonal of the inter-window mesh which makes it possible for the frame sectors to take up the shearing of the window headpiece (in the case of a vertical gust).

A stabilizing plate 20 is positioned between two successive frame supports in the longitudinal direction 12 of the fuselage section. These plates 20 make it possible to stabilize the frame sectors and to take up the efforts on the opening.

Figure 5:
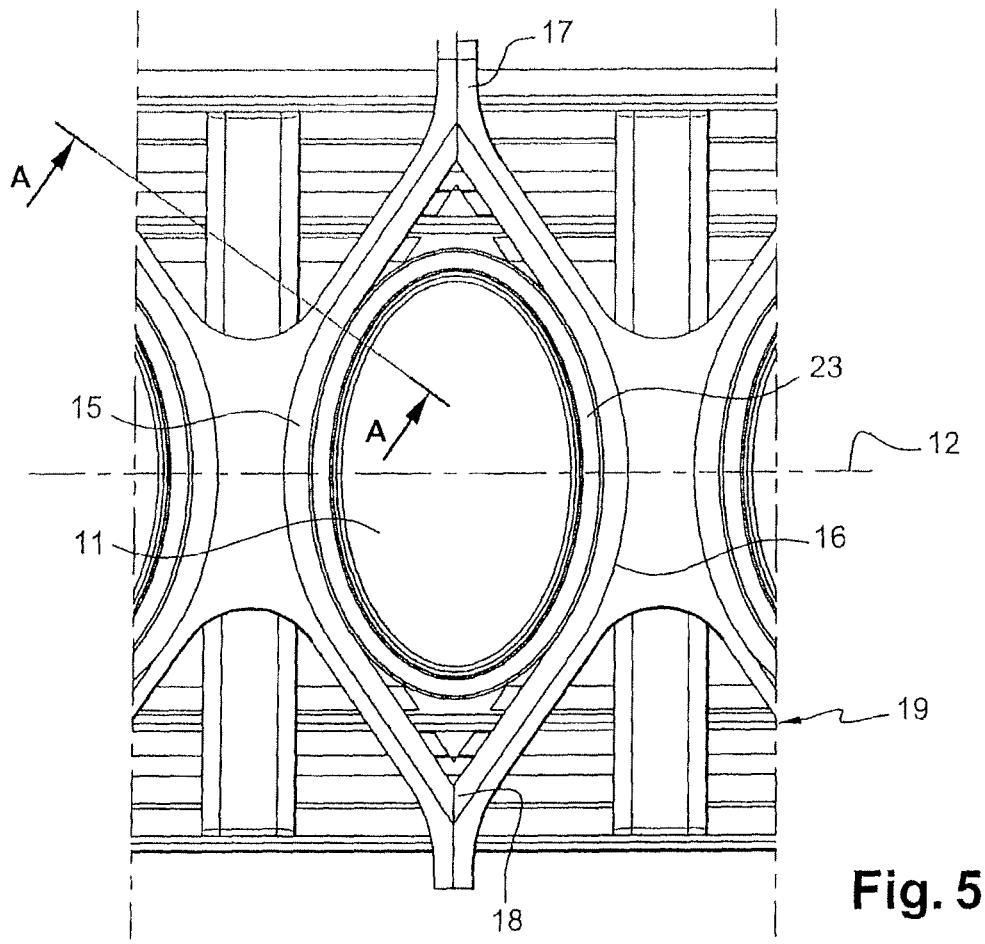
FIG. 5 schematically shows the fuselage section of FIG. 3 as a front view.
Figure 6:
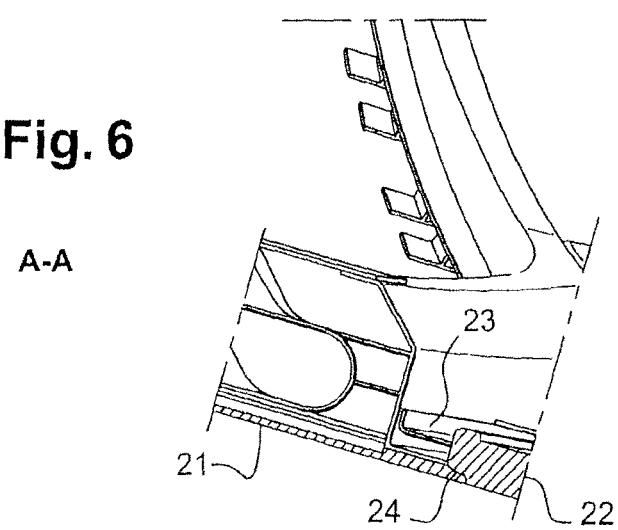
FIG. 6 is a sectional view along axis A-A of the fuselage section of FIG. 5.

FIG. 6 shows a partial sectional view along the axis A-A of the fuselage section in FIG. 5. The elements bearing the same references as the elements of FIG. 3 represent the same objects which will not be described again hereinunder.

The side wall 21 of the fuselage section includes an opening on which a window 11 is mounted. This window 11 includes an external transparent element 22 and at least an internal transparent element (not shown). A flexible joint makes it possible to assemble the external transparent element 22 and the internal transparent element while keeping them separated from one another through an intermediate space. This joint is for example made of elastomer.

The side wall 21 of the fuselage section has a chamfer 24 along the perimeter of the opening, with this chamfer 24 having a shape which is substantially similar to that of an edge of the external transparent element 22 so as to laterally and longitudinally lock the external transparent element 22 in this opening. The outermost surface of the transparent element 22 has a shape providing an aerodynamic continuity with the side wall of the aircraft fuselage.

The window 11 is conventionally fixed on the opening using a fastening clip 23 which is mounted on the frame of the window 11 using nuts and studs.

The cooperation of the stabilizing plates 20 and the fastening clips 23 with the frame sectors makes it possible to stabilize them.

The invention claimed is:

1. A section of a fuselage for an aircraft, said section comprising:
   a plurality of frames; and
   a plurality of openings for receiving windows; and
   a plurality of stringers;
   wherein at least some of the plurality of frames include a frame sector surrounding at least one opening of the plurality of openings, the frame sector including two branches positioned laterally with respect to the opening, the ends of said branches being coupled so as to form a Y at each end of the frame sector, and wherein at least one stringer of the plurality of stringers is disposed between the frame sector and the at least one opening, such that the at least one stringer extends through a portion of each of the two branches.

2. A section according to claim 1, wherein said opening is substantially centered on said frame sector.

3. A section according to claim 1, wherein said frame sector has a substantially elliptic shape.

4. A section according to claim 1, wherein said branches of said frame sector form a recess.

5. A section according to claim 4, wherein said frame sector includes a window fixed to said opening by a fastening clip, at least a part of the perimeter of said fastening clip has a shape cooperating with said branches of the frame sector.

6. A section according to claim 1, wherein two successive frame supports in the longitudinal direction of said section are connected together through a stabilizing plate.

7. A section according to claim 1, wherein said opening has a shape selected from the group including an elliptical shape, a rectangular shape, a triangular shape.

8. A section according to claim 1, wherein, with said frame including at least two frame portions, said section includes members for fixing said frame sectors on said frame portions.

9. A section according to claim 8, wherein said fixing members include splice-plates.

10. A section according to claim 1, wherein said frame sector is made of one piece and of composite material.

11. A section according to claim 1, wherein at least one stringer of the plurality of stringers is positioned tangentially to at least one window opening.

12. An aircraft having a fuselage, the side walls of which include windows, wherein said fuselage includes at least one fuselage section according to claim 1.

13. An aircraft according to claim 12, wherein the transversal dimension of the windows is greater than or equal to the distance separating two successive frames of the fuselage.

* * * * *